United States Patent
McMenamy

(10) Patent No.: US 12,422,044 B2
(45) Date of Patent: Sep. 23, 2025

(54) INLINE, MULTI-PORT BALL VALVE

(71) Applicant: Precision Planting LLC, Tremont, IL (US)

(72) Inventor: Justin McMenamy, Edwards, IL (US)

(73) Assignee: Precision Planting LLC, Tremont, IL (US)

( * ) Notice: Subject to any disclaimer, the term of this patent is extended or adjusted under 35 U.S.C. 154(b) by 565 days.

(21) Appl. No.: 17/935,225

(22) Filed: Sep. 26, 2022

(65) Prior Publication Data
US 2023/0021120 A1    Jan. 19, 2023

Related U.S. Application Data

(62) Division of application No. 16/963,684, filed as application No. PCT/US2019/015487 on Jan. 28, 2019, now Pat. No. 11,486,500.

(60) Provisional application No. 62/622,796, filed on Jan. 26, 2018.

(51) Int. Cl.
| | |
|---|---|
| *F16K 5/06* | (2006.01) |
| *A01C 7/06* | (2006.01) |
| *A01C 21/00* | (2006.01) |
| *A01C 23/00* | (2006.01) |
| *A01C 23/04* | (2006.01) |
| *F16K 37/00* | (2006.01) |

(52) U.S. Cl.
CPC .............. *F16K 5/0605* (2013.01); *A01C 7/06* (2013.01); *A01C 21/00* (2013.01); *A01C 23/007* (2013.01); *A01C 23/04* (2013.01); *F16K 37/0033* (2013.01)

(58) Field of Classification Search
CPC ........ F16K 5/06; F16K 5/0605; F16K 5/0615; F16K 37/0033; A01C 7/06; A01C 21/00; A01C 21/002; A01C 23/007; A01C 23/04
See application file for complete search history.

(56) References Cited

U.S. PATENT DOCUMENTS

| | | | | |
|---|---|---|---|---|
| 5,170,820 | A | * 12/1992 | Jones ................... | A01C 23/024 137/489.5 |
| 9,144,191 | B1 | * 9/2015 | Gramling et al. ... | A01C 23/024 |
| 2016/0007524 | A1 | * 1/2016 | Kusler et al. ......... | A01C 15/06 111/119 |
| 2016/0334030 | A1 | 11/2016 | Robson | |

OTHER PUBLICATIONS

China National Intellectual Property Administration, Search Report for related CN Application No. 201980006787.3, dated Dec. 12, 2022, 6 pages (English translation).

* cited by examiner

*Primary Examiner* — Tara Mayo

(57) ABSTRACT

A ball valve assembly having a valve body with a single inline fluid passage therethrough along a central longitudinal axis. A ball valve is sealingly seated in a valve seat within the valve body. The ball valve includes at least two through-bores, each of the at least two through-bores having a central axis intersecting one another, whereby the ball valve is rotatable between a fully open position and a fully closed position. In one application, the ball valve has two bores intersecting one another such that an angle α between adjacent bore openings of the ball valve are less than 90 degrees and an angle β between other adjacent ends of the ball valve are greater than 90 degrees for applying liquid product in a seed furrow before and after each seed in the furrow but not onto the seed.

13 Claims, 4 Drawing Sheets

(Prior Art -- 4 Way / 4 Port Valve)
(1/8-Turn - Open)

(Prior Art -- 4 Way / 4 Port Valve)
(1/8-Turn - Closed)

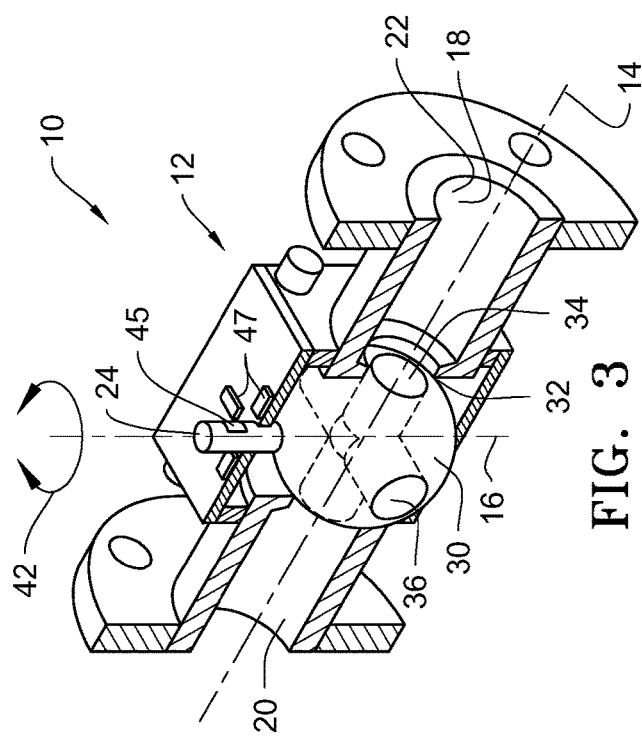
FIG. 2
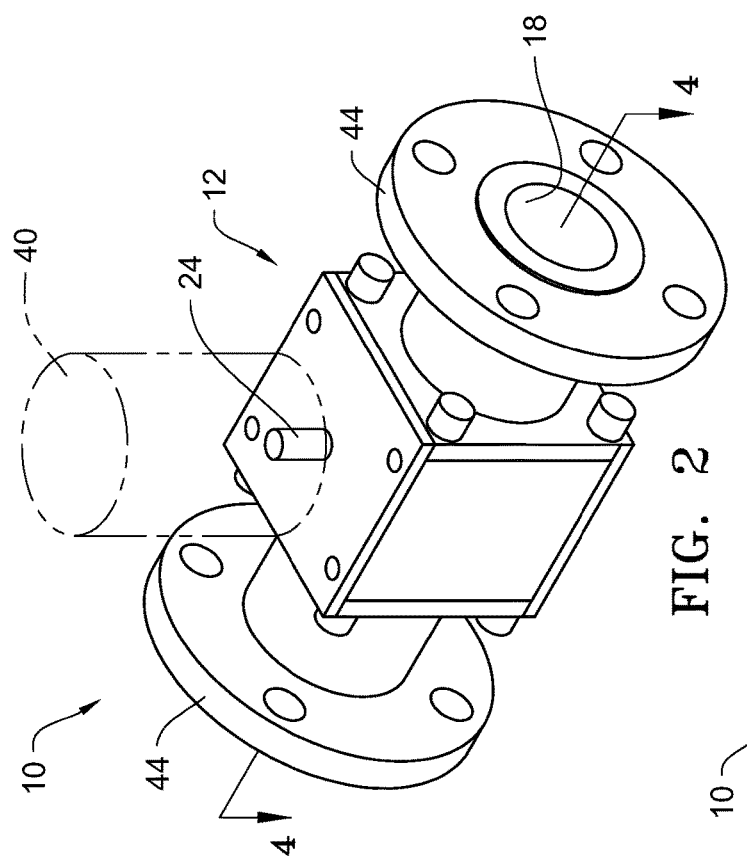
FIG. 3
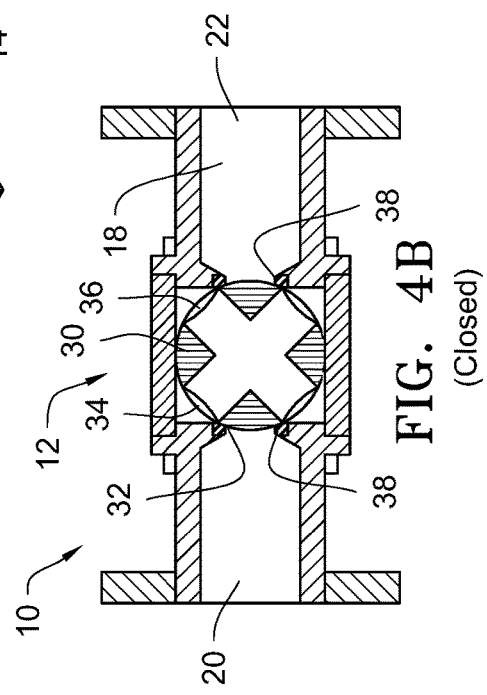
FIG. 4A (Open)
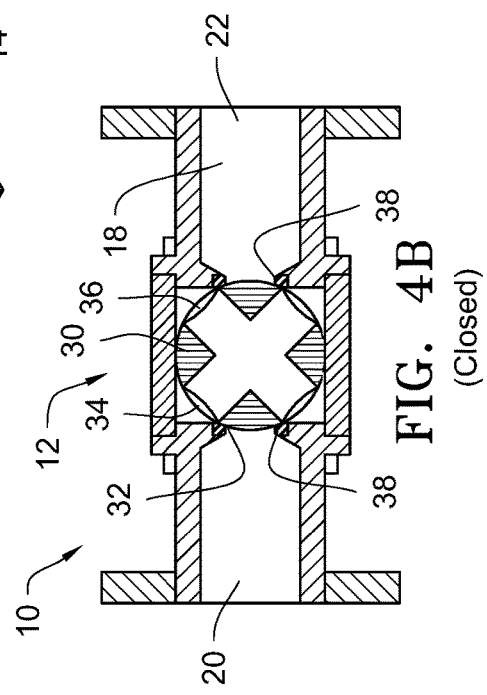
FIG. 4B (Closed)

INLINE, MULTI-PORT BALL VALVE

CROSS-REFERENCE TO RELATED APPLICATIONS

This application is a divisional of U.S. patent application Ser. No. 16/963,684, filed Jul. 21, 2020, which is national phase entry under 35 U.S.C. § 371 of International Patent Application PCT/US2019/015487, filed Jan. 28, 2019, designating the United States of America and published in English as International Patent Publication WO 2019/148144 A1 on Aug. 1, 2019, which claimed the benefit of the filing date of U.S. Provisional Patent Application 62/622,796, filed Jan. 26, 2018, the entire disclosure of each of which is incorporated herein by reference.

BACKGROUND

Ball valves or plug valves are well known in the art. Ball valves for inline, two-port applications, such as disclosed in U.S. Pat. No. 5,183,073, generally comprise a valve body defining a straight flow path between a fluid inlet port and a fluid outlet port. A rotatable ball or spherical plug having a single bore through its center is sealingly seated within the valve body. A stem extending through the valve body is attached at its lower end to the ball. A hand lever is typically attached to the other end of the stem. To open the ball valve so that fluid is permitted to flow through the fluid passage of the valve body, the handle is turned to align the single bore through the ball with the fluid passage of the valve body. To close the valve so that no fluid is permitted to flow through the passage, the handle is rotated in the opposite direction, such that the single bore through the ball is at a right angle or 90 degrees to the fluid passage of the valve body. Because the handle or ball must be rotated 90 degrees to fully open or fully close the ball valve, such ball valves are commonly referred to as "quarter turn" ball valves.

Ball valves with two or more bores through the ball are also known in the art, but such ball valves are used in connection with 4-way, 4-port valves as shown in FIGS. 1A and 1B and as disclosed in CN203948711 and DE19740392. Accordingly, there is a need for an inline, two-port ball valve that will permit the valve to be fully opened and fully closed with a ⅛-turn.

BRIEF DESCRIPTION OF THE DRAWINGS

FIG. 2 is an isometric view of an embodiment of an inline, two-port, ⅛-turn ball valve.

FIG. 3 is an isometric, partial cutaway view of the ball valve of FIG. 2 showing the ball seated in the ball seat within the valve body.

FIG. 4A is a cross-sectional view of the ball valve of FIG. 2 as viewed along lines 4-4 of FIG. 2 and showing the valve in the open position.

FIG. 4B is another cross-sectional view of the ball valve of FIG. 2 as viewed along lines 4-4 of FIG. 2 and showing the valve in the closed position.

DETAILED DESCRIPTION

Figure 1A:
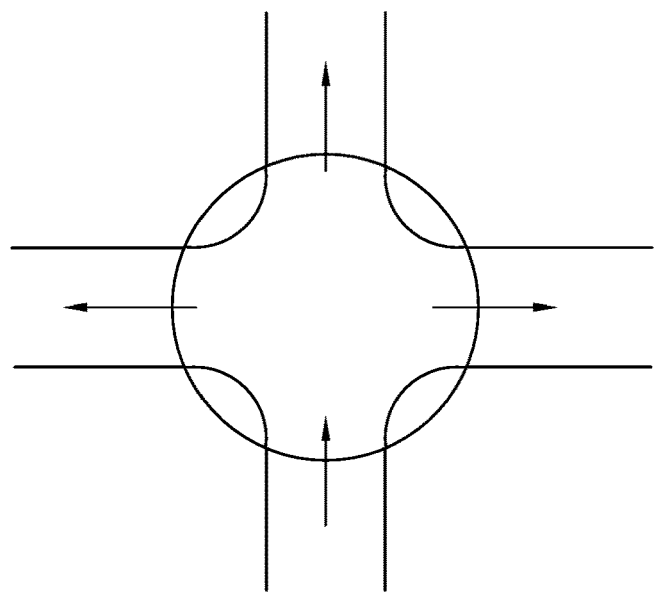
FIGS. 1A and 1B are schematic illustrations of a prior art 4-way, 4-port valve with a ⅛-turn ball valve in the open and closed position, respectively.
Figure 1B:
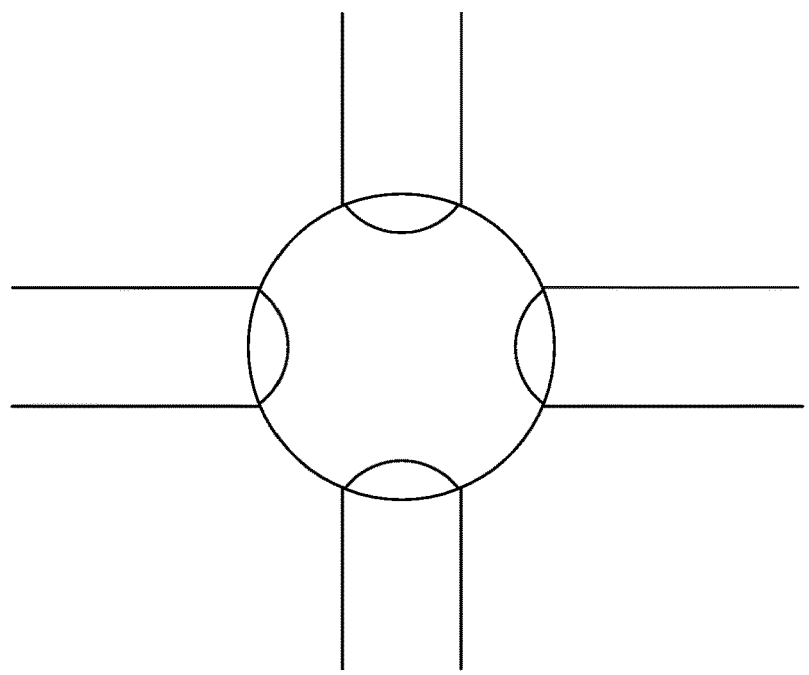

Referring to the drawings, wherein like reference numerals indicate the same or corresponding parts, FIG. 2 is an isometric view of an embodiment of an inline, two-port, ⅛-turn ball valve assembly 10. FIG. 3 is an isometric partial cross-sectional view of the ball valve assembly 10 of FIG. 2. As best viewed in FIG. 3, the ball valve assembly 10 comprises a valve body 12 having a longitudinal axis 14 and a transverse axis 16. A fluid passage 18 extends through the valve body 12 coaxial with the longitudinal axis 14 such that the two ports, i.e., an inlet port 20 and an outlet port 22, are inline. An operating stem 24 is rotatably journaled in the valve body 12 coaxial with the transverse axis 16. The operating stem 24 is fixedly joined at a lower end to a generally spherical ball valve 30 seated in a valve seat 32 within the valve body 12. In this embodiment, bores 34, 36 are shown extending through the ball valve 30 intersecting one another at approximately 90-degree angles along a plane coincident with the longitudinal axis 14. Annular sealing rings 38 fluidly seal the ball valve 30 within the valve seat 32. An actuator 40 may be coupled to the upper end of the operating stem 24 to cause rotation of the operating stem 24 in either direction (i.e., clockwise or counterclockwise) as indicated by arrow 42. The rotation of the stem 24 causes the ball valve 30 fixed thereto to rotate within the valve seat 32.

FIG. 4A shows the valve assembly 10 in the open position with the bore 34 aligned with the fluid passage 18 of the valve body 12, thus permitting fluid to flow through the valve assembly 10. FIG. 4B shows the valve assembly 10 in the closed position with the ball valve 30 rotated ⅛ of a turn or about 45 degrees such that both bores 34, 36 are out of alignment with the fluid passage 18, thus preventing fluid to flow through the valve assembly 10. It should be appreciated that with the two bores 34, 36 positioned at 90-degree angles from one another allows the valve assembly 10 to be fully opened or fully closed with a ⅛-turn or about a 45-degree angular rotation of the ball valve 30 in either direction. It should also be appreciated that the stem 24 and ball valve 30 may be rotated in ⅛ incremental turns in a singular direction (i.e. continuously clockwise or continuously counterclockwise) to open and close the valve assembly 10. Alternatively, rather the rotating in a singular direction, the stem 24 and ball valve 30 may be rotated ⅛ turn in one direction (e.g., clockwise) and then in the reverse direction (e.g., counterclockwise) to open and close the valve assembly 10.

In operation, the actuator 40 may be configured to limit the rotation of the stem 24 and ball valve 30 to ⅛ of a turn or approximately 45 degrees upon each actuation to ensure that the valve assembly 10 is either in a fully open or fully closed condition. In one embodiment, a magnet 45 can be disposed on stem 24 or valve body 12 and Hall-effect sensors 47 can be disposed on the valve body 12 or stem 24 opposite the magnet 45. When the magnet 45 and Hall-effect sensors are aligned (indicating alignment of one of the bores 34, 36 with the passage 18) it may indicate a zero position for the ball valve 30 and the actuator 40 that drives the rotation of stem 24 for calibrating a percent of rotation. A ball valve configured in this manner will allow for faster opening and closing of the valve under operating conditions, providing more precise timing and control of fluid flow through the valve. One exemplary use for such a ball valve is in the application of agricultural chemicals to a field. By providing faster opening and closing of the valve, an operator is better able to control the application of chemicals to minimize over-spraying and under-spraying.

Figure 5:
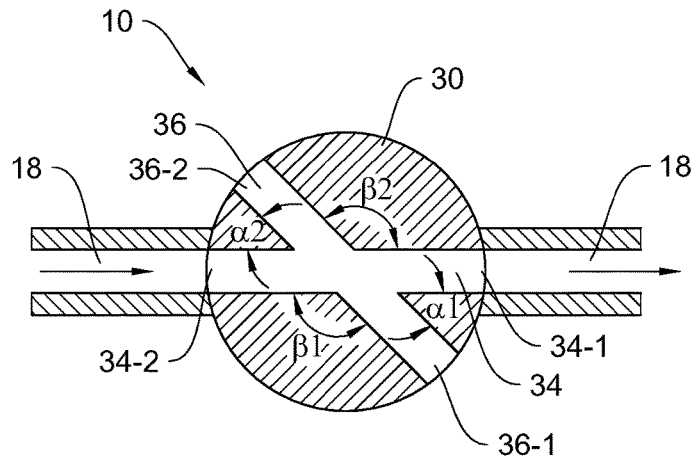
FIG. 5 is a cross-sectional view of another embodiment of a ball valve.
Figure 6:
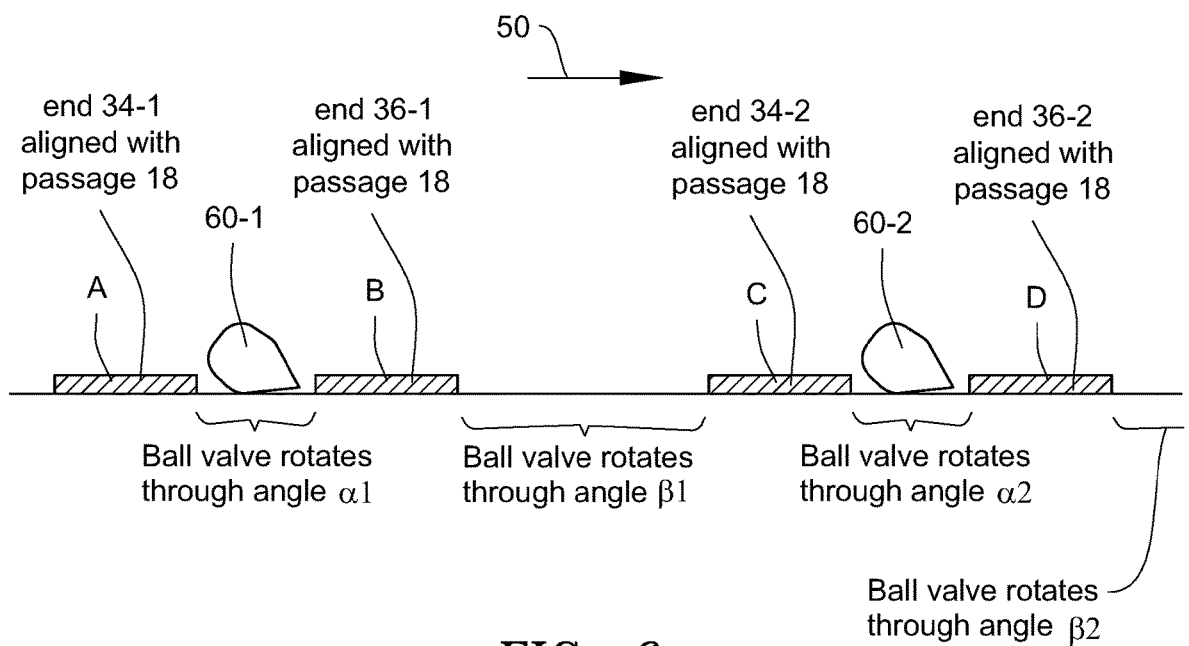
FIG. 6 is a schematic illustration showing liquid product applied intermittently to each side of a seed using the ball valve of FIG. 5.

In an alternative embodiment as shown in FIG. 5, rather than the bores 34, 36 intersecting one another at 90-degree angles such that the bore openings are equally spaced, it may be desirable to not have the bore openings equally spaced. A benefit of such configuration is that it allows both a smaller angle of rotation (and thus a shorter time period) between alignment of a bore opening with the outlet port 22 of the ball valve body 12 and a greater angle of rotation (and thus a longer time period) between alignment of the other bore openings with the outlet port 22 of the ball valve body 12. A practical application of a valve with such a configuration is to have the rotation of the ball valve 30 timed to deposit liquid to each side of a seed deposited in a seed furrow during planting operations but not onto the seed, such as shown in FIG. 6. Thus, referring to FIG. 5, the first bore 34 has a first open end 34-1 and a second open end 34-2, and the second bore 36 has a third open end 36-1 and a fourth open end 36-2. A small angle $\alpha 1$ is between the first open end 34-1 and the third open end 36-1, and a small angle $\alpha 2$ is between the second open end 34-2 and the fourth open end 36-2. A larger angle $\beta 1$ is between the third open end 36-1 and second open end 34-2, and a larger angle $\beta 2$ is between the fourth open end 36-2 and the first open end 34-1. Referring to FIGS. 5 and 6 together, assume liquid product is being applied within a seed furrow as the planter deposits seeds in the seed furrow as the planter advances in a forward direction of travel indicated by arrow 50 in FIG. 6. Although not shown in FIG. 6, it should be appreciated that a liquid delivery tube is aligned with the seed furrow and the ball valve is disposed along the liquid delivery tube. The liquid delivery tube is in fluid communication with a liquid product source delivering liquid product to the inlet port 22 of the ball valve assembly 10. As the planter advances in the forward direction of travel 50, the ball valve 30 is rotated by the actuator 40 at a rotation rate corresponding to the speed of the planter and the population rate at which the seed is being planted. For purposes of this example, it is assumed that the ball valve 30 is being rotated in the counter-clockwise direction as viewed in FIG. 5, although it should be appreciated that the rotation could be in the clockwise direction or the actuator 40 may rotate back and forth between a clockwise and counter-clockwise direction. The first open end 34-1 of the first bore 34 is timed to be in alignment with the outlet port 22 and passage 18 of the ball valve body so liquid product is delivered to the seed furrow rearward of the deposited seed 60-1 (designated by strip "A" in FIG. 6). The flow of the liquid product from the liquid delivery tube is interrupted prior to reaching the deposited seed 60-1 as the ball valve rotates into the closed position through the angle $\alpha 1$. As the planter continues in the forward direction of travel, the actuator 40 continues to rotate the ball valve 30 at the rotation rate. As the third end 36-1 of the second bore 36 rotates into alignment with the outlet port 22 and passage 18 of the ball valve body 12, the liquid product is again delivered to the seed furrow forward of the deposited seed 60-1 (designated by strip "B" in FIG. 6). As the actuator 40 rotates the ball valve 30 into the closed position through the angle $\beta 1$, the flow of the liquid product from the delivery tube is once again interrupted. As the planter continues to advance in the forward direction of travel, liquid product is again delivered into the seed furrow rearward of the next deposited seed 60-2 as the second open end 34-2 of the first bore 34 moves into alignment with the outlet port 22 and passage 18 of the ball valve body 30 (designated by strip "C" in FIG. 6). As the ball valve 30 rotates into the closed position through the angle $\alpha 2$, the flow of the liquid product is interrupted prior to reaching the next deposited seed 60-2. The liquid product is again delivered to the furrow as the fourth end 36-2 of the second bore 36 rotates into alignment with the outlet port 22 and passage 18 of the ball valve body 12 (designated by strip "D" in FIG. 6). The liquid product from the liquid delivery tube is once again interrupted as the ball valve 30 rotates into the closed position through the angle $\beta 2$. This process is repeated with respect to each of the deposited seeds in the seed furrow as the planter advances in the forward direction of travel.

While the ball valve assembly 10 is depicted in FIGS. 2-4B with the inlet and outlet ports 20, 22 having flanges 44 for bolting to a fluid conduit or pipe (not shown) with mating flanges, it should be appreciated that, depending on the application, the flanges 44 may be eliminated and the inlet and outlet ports 20, 22 may be internally threaded or externally threaded to threadably couple to a tube, conduit, or pipe, or the inlet and outlet ports 20, 22 may include or be adapted to connect to a conduit with compression fittings or any other suitable coupling means.

Additionally, while the valve body 12 is depicted in FIGS. 2-4B as being fabricated from individual components fixed together by weldments and/or fasteners, it should be appreciated that the valve body 12 may be a unitary body that is cast or molded from any suitable materials depending on the application, including, but not limited to metal or plastic.

Furthermore, rather than an actuator 40 to rotate the operating stem 24 for opening and closing the valve, a lever or hand wheel may be attached to the stem for rotation manually by hand. In such an embodiment, marking (not shown) can be placed on the valve body 12 to align with the lever to indicate the alignment of the bores 34, 36 with the fluid passage 18 to indicate whether the valve is in either a fully open or fully closed condition.

Figure 7:
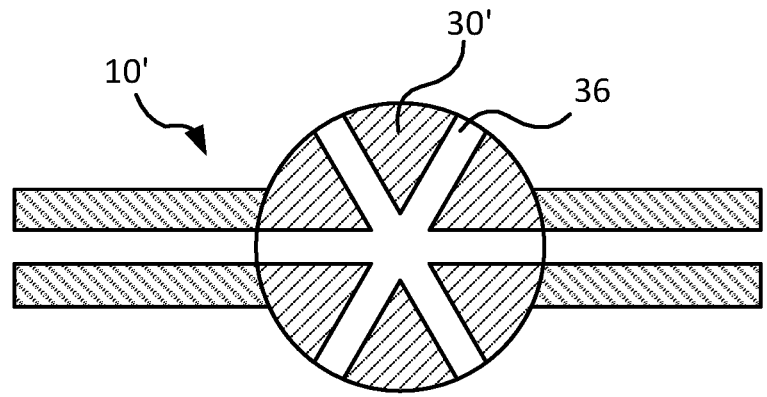
FIGS. 7, 8, and 9 are cross-sectional views of other embodiments of a ball valve.
Figure 8:
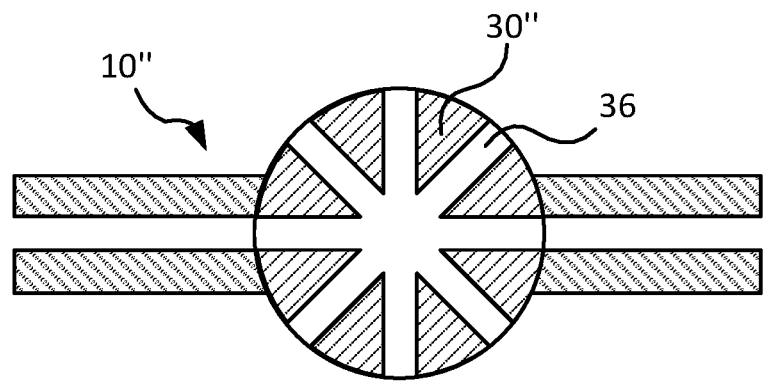
Figure 9:
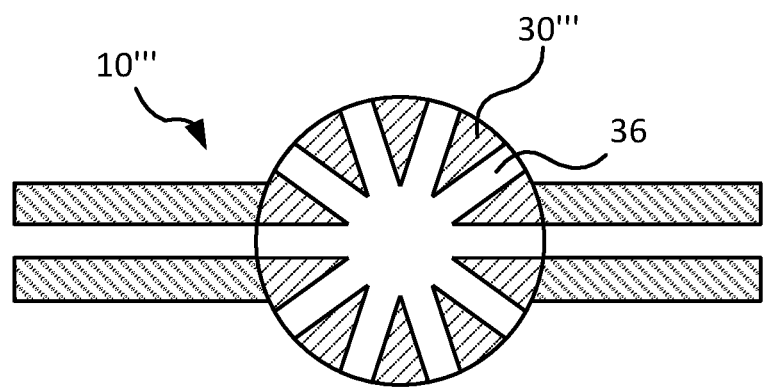

Also, while illustrated with two bores 34, 36, a ball valve assembly 10' shown in FIG. 7 may have a ball valve 30' with three bores 36 with the central axis of each of the three bores intersecting at an angle of 60 degrees, such that $\frac{1}{12}$th of a full rotation of the ball valve in either direction of rotation from the fully open position moves the ball valve to the fully closed position and vice-versa. Alternatively, a ball valve assembly 10" shown in FIG. 8 may have a ball valve 30" with four bores 36 with the central axis of each of the four bores intersecting at an angle of 45 degrees, such that $\frac{1}{16}$th of a full rotation of the ball valve in either direction of rotation from the fully open position moves the ball valve to the fully closed position and vice-versa. Alternatively, a ball valve assembly 10''' shown in FIG. 9 may have a ball valve 30''' with five bores 36 with the central axis of each of the five bores intersecting at an angle of 36 degrees, such that $\frac{1}{20}$th of a full rotation of the ball valve in either direction of rotation from the fully open position moves the ball valve to the fully closed position and vice-versa. It should be appreciated that the ball valve 30 may include more bores up to any number that can be disposed through ball valve 30.

The present invention is not to be limited to the embodiments of the apparatus, systems, and methods described herein and illustrated in the drawing figures, but should be accorded the widest scope consistent with the disclosure and the appended claims.

The invention claimed is:

1. A method of applying liquid product during a planting operation, the method comprising:
   advancing a planter through a field;
   passing a liquid product carried by the planter through a first bore of a ball valve and a fluid passage of a valve body to deliver the liquid product to a ground surface while the planter advances through the field;

rotating the ball valve such that the first bore of the ball valve is not aligned with the fluid passage of the valve body, such that the liquid product stops flowing to the ground surface;

planting a seed at a portion of the ground surface not receiving the liquid product;

rotating the ball valve while planting the seed to align a second bore of the ball valve with the fluid passage after the seed is planted; and passing the liquid product through the second bore and the fluid passage to deliver the liquid product to the ground surface while the planter advances through the field.

2. The method of claim 1, wherein rotating the ball valve comprises continuously rotating the ball valve at a constant rotational velocity.

3. The method of claim 1, further comprising rotating the ball valve from alignment of the second bore with the fluid passage to realign the first bore with the fluid passage.

4. The method of claim 3, wherein planting the seed occurs during a rotation of the ball valve of less than 90 degrees between alignment of the first bore with the fluid passage and alignment of the second bore with the fluid passage.

5. The method of claim 4, wherein realigning the first bore with the fluid passage occurs during a rotation of the ball valve of greater than 90 degrees.

6. The method of claim 1, further comprising planting at least two singulated seeds during a full rotation of the ball valve.

7. The method of claim 1, wherein the liquid product and the seed are each deposited within a furrow formed by the planter.

8. The method of claim 7, wherein the liquid product is deposited forward and rearward of the seed as the planter advances through the field.

9. The method of claim 8, wherein the liquid product is not deposited onto the seed.

10. The method of claim 1, wherein rotating the ball valve comprises rotating the ball valve with an actuator.

11. The method of claim 1, wherein the first bore and the second bore each have a common and consistent diameter.

12. The method of claim 1, further comprising generating a signal indicative of a position of the ball valve with respect to the fully open position or the fully closed position.

13. The method of claim 12, wherein generating a signal comprises generating a signal with a Hall-effect sensor arranged on a body of the ball valve and configured to detect a magnet arranged on an operating stem of the ball valve.

* * * * *